United States Patent
Wegscheid

[15] 3,696,596
[45] Oct. 10, 1972

[54] WATERMELON HARVESTING DEVICE

[72] Inventor: Stanley C. Wegscheid, P.O. Box 336, La Belle, Fla. 33935

[22] Filed: March 23, 1970

[21] Appl. No.: 21,867

[52] U.S. Cl. .......................... 56/327, 214/1 BS, 294/64
[51] Int. Cl. .............................................. A01d 51/00
[58] Field of Search ............... 56/15.9, 16.1, 327, 328; 214/1 BS, 1 BT, 1 BH, 1 BV; 294/64, 65

[56] References Cited

UNITED STATES PATENTS

| | | | |
|---|---|---|---|
| 2,280,658 | 4/1942 | Miller | 294/64 |
| 2,502,810 | 4/1950 | Waters | 56/328 R |
| 2,887,849 | 5/1959 | Lytle | 294/64 |
| 2,993,323 | 7/1961 | Tubbs | 56/330 |
| 3,361,469 | 1/1968 | Yeager, Jr. | 294/64 |

*Primary Examiner*—Russell R. Kinsey
*Attorney*—Alfred E. Wilson

[57] ABSTRACT

A watermelon harvesting device consisting of a plurality of individual watermelon harvesters supported along the length of a boom structure, one of said boom structures being adapted to be fixed to each side of a vehicle such as a truck or tractor in a laterally outwardly extending disposition whereby the vehicle may be driven along a path or road extending through a watermelon field with the harvester supporting booms extending outwardly to overlie certain of the beds of the watermelon field on each side of the vehicle. Each of the watermelon harvesters comprises a vacuum controlled watermelon engaging head and hydraulically electrically controlled mechanical means whereby a watermelon when engaged by said head may be automatically lifted and swung into position over a conveyor means, the watermelon when reaching this position is automatically deposited on said conveyor means with the head being returned to a position to engage another watermelon. One or more of said watermelon harvesters may be operated by one person.

18 Claims, 7 Drawing Figures

INVENTOR.
STANLEY G. WEGSCHEID
BY Alfred B. Wilson.
ATTORNEY.

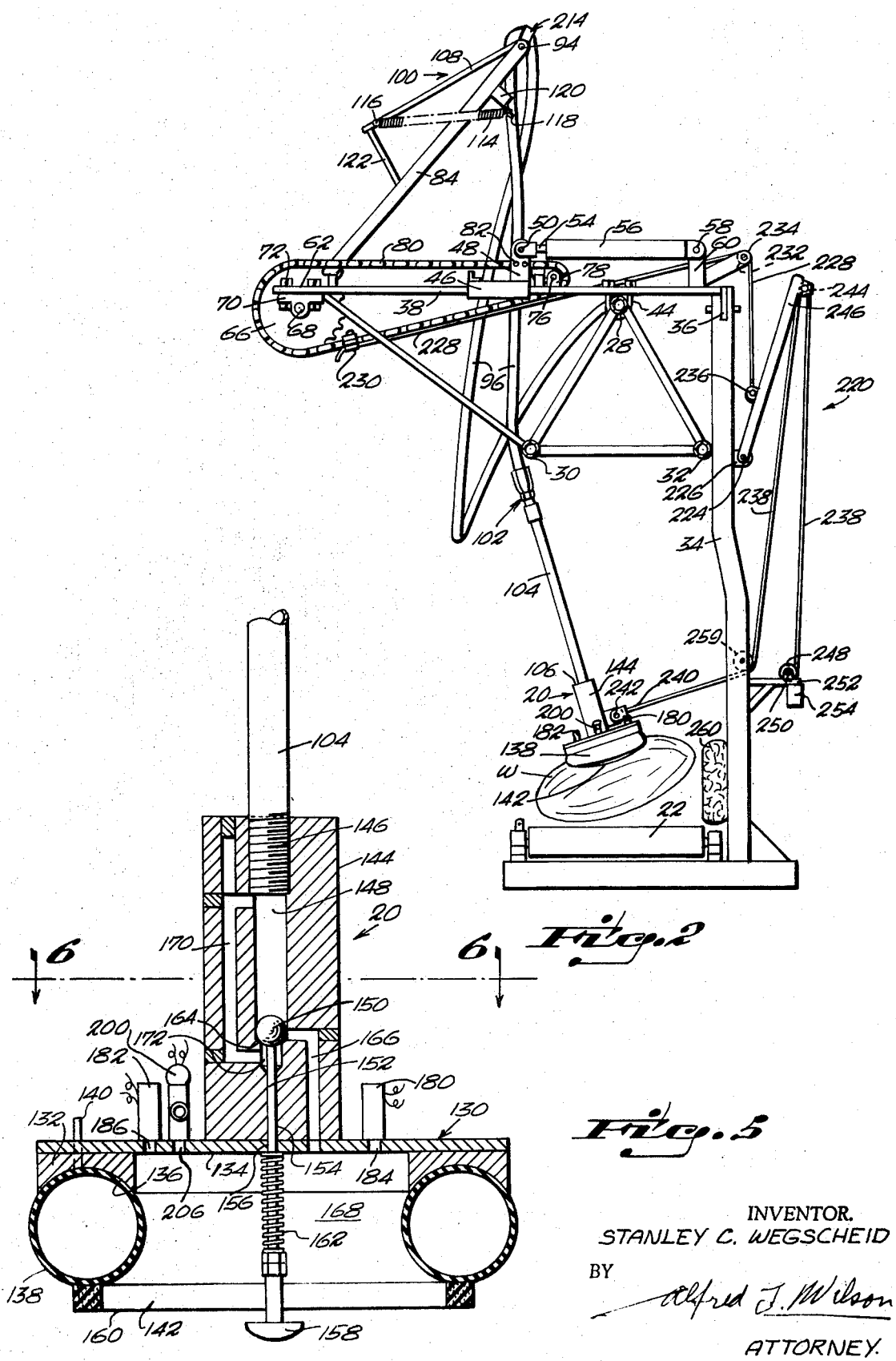

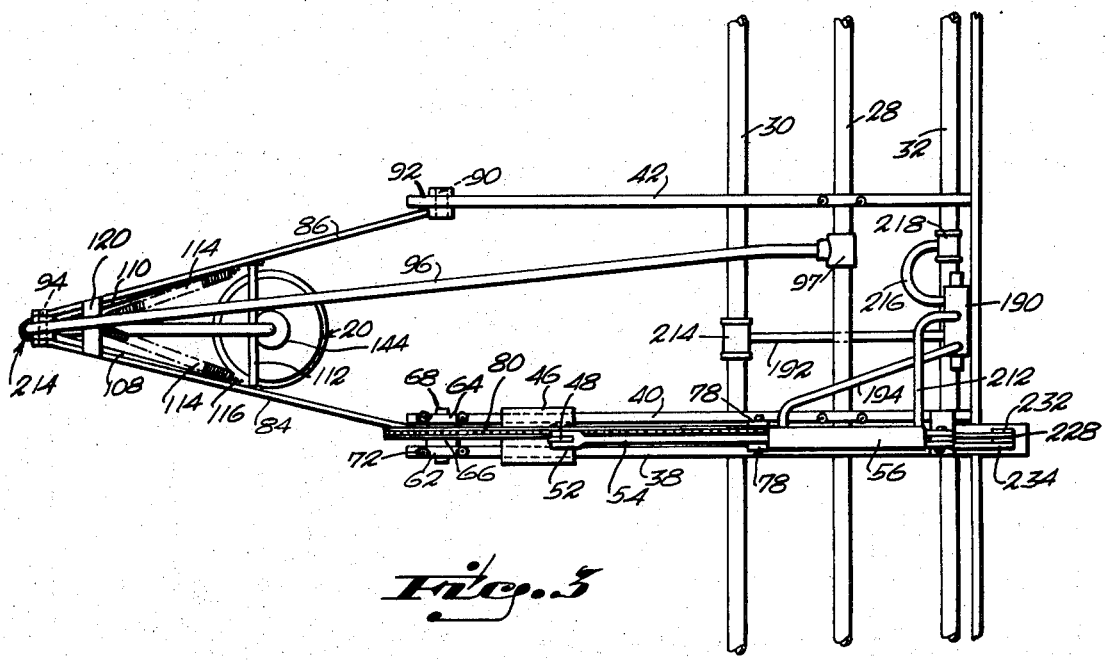
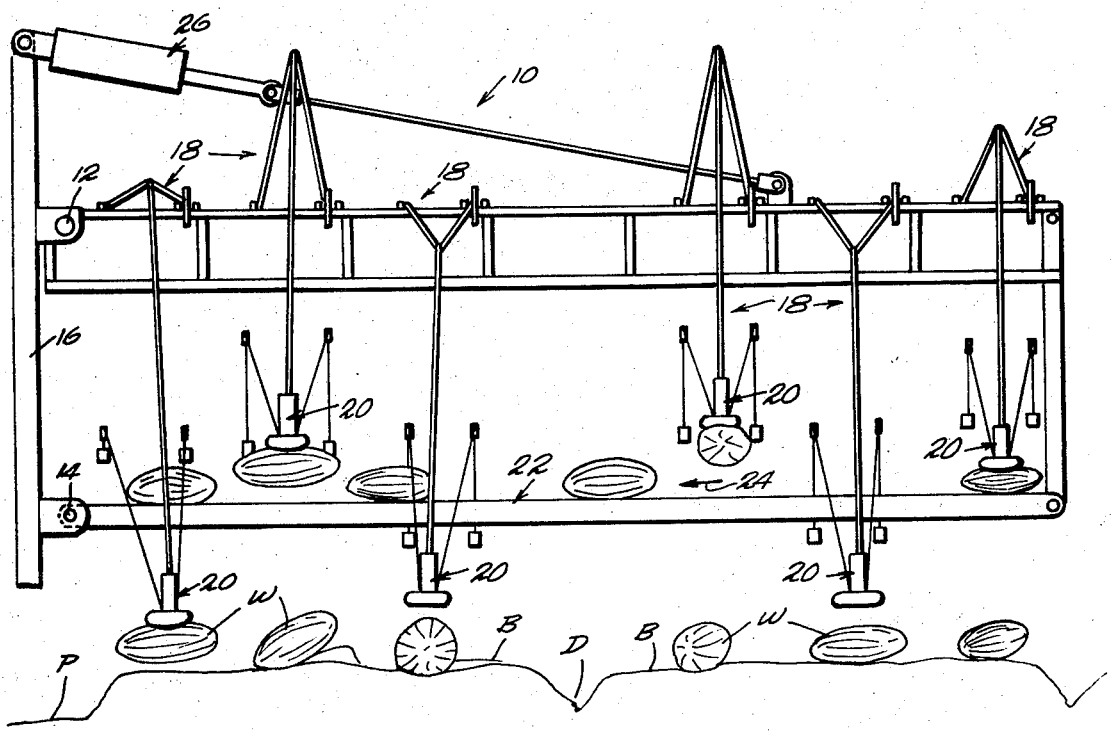
INVENTOR.
STANLEY C. WEGSCHEID
BY
Alfred L. Wilson
ATTORNEY.

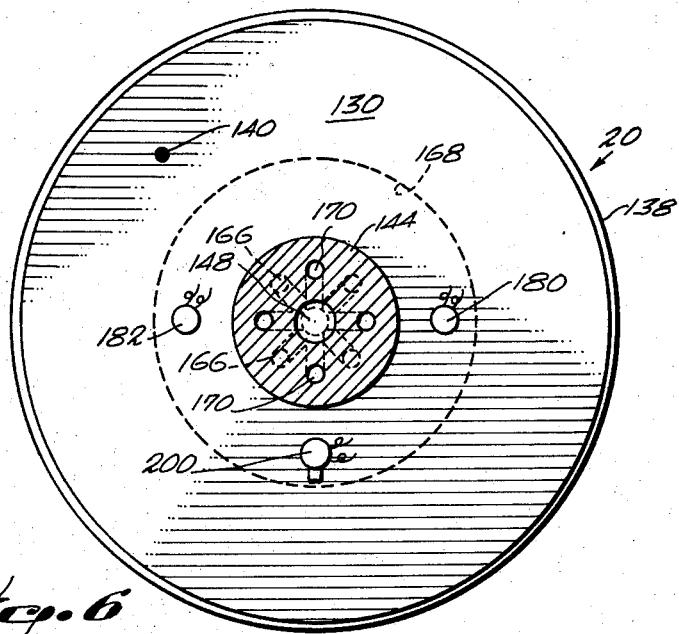
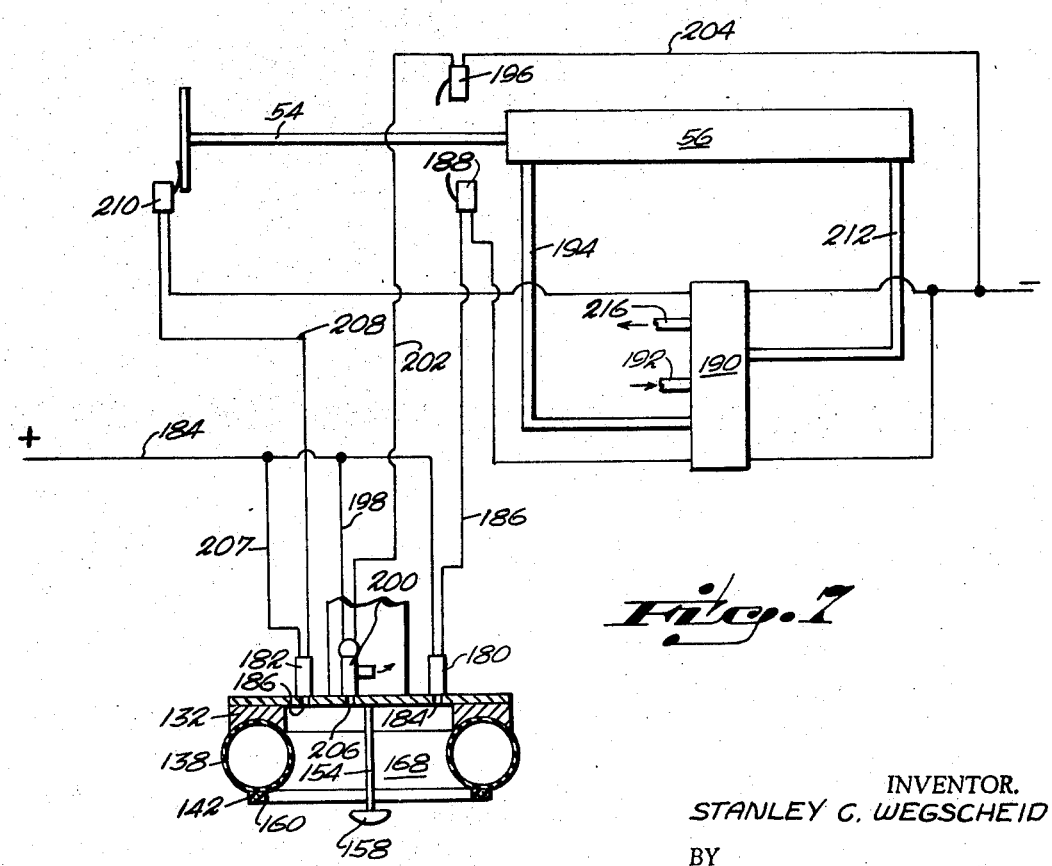

WATERMELON HARVESTING DEVICE

Watermelon harvesting has generally been a very laborious job and requires the services of a considerable number of people. In recent years, because of the improvements in fertilizers, etc., watermelons attain a very considerable size and weight. It has been the general practice in the past to drive a vehicle such as a large truck through a watermelon field, as the harvesting progresses, with a substantial number of people being required to cut the melons from the vines and to carry each individual watermelon to the truck where others are engaged in stacking the melons. In many instances watermelons are thrown from one operator to another as they progress toward the truck. This is extremely hard work.

The present invention comprises a harvesting device consisting of a plurality of individual watermelon harvesters supported along the length of a boom structure, one of said boom structures extending laterally outwardly, preferably from opposite sides of a vehicle such as a truck or tractor in a manner so as to overlie certain of the beds of a watermelon field on each side of the vehicle as said vehicle is moved along a path extending through the melon field. One or more of the individual watermelon harvesters may be handled by a single operator.

One of the principal objects of the present invention is, therefore, to provide a watermelon harvesting device which requires the services of fewer people than the hand harvesting methods generally practiced in the past.

Another principal object of this invention is to provide each individual harvester with a vacuum controlled watermelon engaging and pick-up head whereby it is only necessary to cut a watermelon from the vine and for an operator to press the vacuum controlled head down firmly onto the watermelon.

A still further object of this invention is to provide hydraulically and electrically controlled mechanical means whereby the act of engaging the vacuum controlled head with a watermelon automatically causes the harvester to cycle in such a manner as to lift the watermelon from the ground, swing it into position over an appropriate conveyor, deposit the watermelon on the conveyor and to return the vacuum controlled head to a general position for engagement with the next watermelon to be harvested.

Yet another object of my invention is to provide a plurality of watermelon harvesters on boom structures extending laterally outwardly from each side of a vehicle in such a manner as to be operable along a path of a very substantial width, through the watermelon field as the harvesting progresses.

A still further object of this invention is to greatly lessen the time required to harvest watermelons by eliminating the manual lifting and carrying or throwing of each individual watermelon from its position in a watermelon field to the collection vehicle.

Another object of the present invention is to greatly increase the endurance of the harvestor operators by eliminating the necessity of physically lifting and carrying or throwing of very heavy watermelons, sometimes over very considerable distances, with a resulting substantial savings in labor, time and money.

In the drawings:

FIG. 2 is a side elevational view thereof, similar to FIG. 1, illustrating the operation thereof in depositing a watermelon on the conveyor;

FIG. 3 is a top plan view of the harvester as illustrated in FIG. 1;

FIG. 4 is a schematic illustration of a plurality of watermelon harvesters, in accordance with the present invention, mounted on a boom as carried on both sides of a vehicle such as a truck or tractor;

FIG. 5 is an enlarged vertical sectional view, through the watermelon engaging and pick-up head, taken along the line 5—5 in FIG. 1 looking in the direction of the arrows;

FIG. 6 is a transverse sectional view taken along the line 6—6 in FIG. 5 looking in the direction of the arrows; and FIG. 7 is a schematic illustration of the wiring and hydraulic control means of the watermelon harvester.

Figure 1:
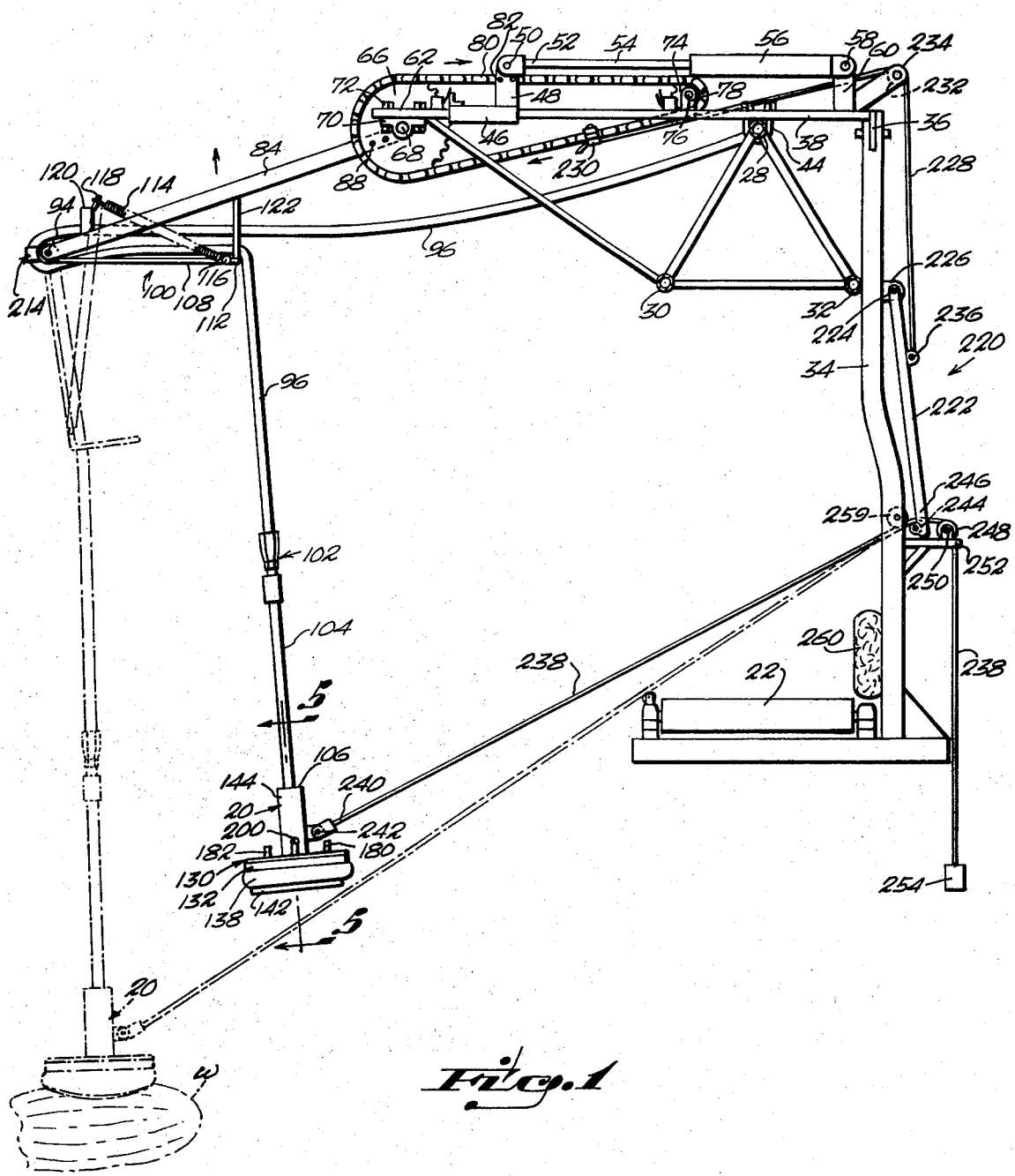
FIG. 1 is a side elevational view of a single watermelon harvesting device in accordance with the present invention.

In the drawings in which like reference characters designate like or similar parts throughout the various views and with reference first to FIG. 4, a boom structure illustrated generally at 10 is pivotally mounted as at 12 and 14 to a vertical beam 16 which is mounted in any conventional manner to one side of a vehicle (not shown) such as a truck or tractor. A plurality of watermelon harvesting units of the present invention, indicated generally at 18, are mounted on the boom 10 in a manner to be subsequently described in more detail. It should be pointed out that a boom structure 10, carrying a plurality of the watermelon harvesting units 18 as illustrated in FIG. 4, is preferably mounted on both sides of said vehicle is a manner so as to extend laterally outwardly to pass over a substantially broad portion of the watermelon field, on both sides of the vehicle, as the harvesting of the watermelons progresses.

As illustrated in FIG. 4 it is common practice to plant watermelons W in long parallel raised beds B (two of which are illustrated in FIG. 4) with irrigation ditches D therebetween. An open path or roadway P is generally left between every four or six raised, parallel beds for passage of the harvesting vehicle. As illustrated in FIG. 4, such a path or roadway P would be provided between every four beds and the harvesting carrying booms 10 are sized to span two beds on each side of the vehicle with, for example three watermelon harvesting units 18 being provided for each bed B. It should be noted, however, that the number and spacing of the beds and roadways as well as the length of the boom and number of units 18 are all subject to change and variations without departing from the spirit of my invention, and have been illustrated in FIG. 4 as described by way of example only.

In operation, an operator is assigned to one or more of the harvesting units 18 and is required only to harvest the watermelons W from the assigned rows prior to pushing a vacuum controlled watermelon engaging and pick-up head 20 of a unit 18 firmly onto a watermelon W as illustrated in FIG. 4. It is common practice to have a watermelon selector go ahead of the harvester and cut the melons to be harvested from their vines and to turn them over exposing the white bottom. The engagement of the watermelon W with the head 20 activates or cycles the unit 18 whereby the watermelon is raised from the ground, swung inwardly over a conveyor 22 and deposited thereon. The conveyor 22 moves the watermelons toward the vehicle as indicated by arrow 24 where they may be stacked manually or fed onto an automatic or semi-automatic conveyor system for stacking (not illustrated). After depositing the watermelon on the conveyor 22 the head 20 returns to its starting position, completing a cycle, for engagement with another watermelon. As illustrated generally at 26, each boom may include a hydraulic cylinder means 26 for raising the boom while the vehicle is driven to or from a watermelon field.

The following detailed description will be in the singular and apply to a single watermelon harvester 18 as illustrated in FIGS. 1, 2, 3, 5 and 6. Three longitudinal tubular frame members 28, 30 and 32, vertical upright members 34 and a longitudinal beam 36 form part of the boom and support the plurality of watermelon harvesters 18 as illustrated best in FIGS. 1, 2 and 3. Each harvester 18 comprises three longitudinally extending, generally horizontally disposed arms, two of said arms 38 and 40 are positioned in a closely adjacent parallel spaced relation to form one side of the top of the harvester 18 and the third arm 42 is positioned in a coplaner parallel relation to arms 38 and 40 and is spaced a substantial distance therefrom, forming the opposed side of the top.

The rearward ends of each arm 38, 40 and 42 are fixed as by welding to the beam 36 and a spaced portion thereof is secured to the tubular member 28 as by U bolts 44.

A slide block 46 spans the arms 38 and 40 in slidable engagement therewith and includes an upstanding lug 48 providing a pivotal attachment 50 for the distal end 52 of the piston rod 54 of a hydraulic cylinder 56, the rear end of said cylinder being pivotally attached as at 58 to an upstanding lug 60 fixed to the arms 38 and 40. Adjacent the extended forward ends 62 and 64 of the arms 38 and 40, a sprocket 66 is disposed between said arms, the stub shaft 68 of which is journalled in a pair of pillow blocks 70 bolted as at 72 to said forward ends. A second substantially smaller sprocket 74 is positioned substantially rearwardly of the sprocket 66 on a stub shaft 76 in a pair of upstanding ears 78 fixed to the arms 38 and 40. A chain 80 is disposed about the sprockets 66 and 74 and is pinned as at 82 to the upstanding lug 48 of the slide block 46. Therefore, in and out movement of the piston rod 54 is transmitted to the chain 80 with resulting clockwise or counterclockwise rotation of the sprocket 66.

A pair of outwardly converging pick-up arms 84 and 86 are respectively fixed to the sprocket 66 as at 88 and pivotally attached by pin means 90 adjacent the outwardly extending end 92 of the arm 42. The clockwise and counterclockwise movement of sprocket 66 is therefore imparted to the pick-up arms 84 and 86, the outer converging end of which are attached in a spaced relation by pin means 94.

As best illustrated in FIGS. 1, 2 and 3 a flexible vacuum conduit 96 is attached to the tubular frame member 28 by a T fitting 97. In the preferred form, the tubular frame member 28 doubles as a vacuum manifold and is attached to a conventional vacuum pump (not shown) carried by the harvesting vehicle and provides vacuum to each of the harvesting units on the boom 10. It is readily apparent, however, that separate vacuum supply conduits could be provided.

With further reference to FIGS. 1, 2 and 3, the flexible vacuum conduit 96 extends forwardly from the frame member 28 and passes over the attached outer converging ends of the pick-up arms 84 and 86, and as illustrated in FIG. 1 then passes substantially horizontally rearwardly over a slack take-up structure 100, and then downwardly for attachment as at 102 to a rigid conduit 104 fixed to the top 106 of the watermelon engaging and lifting head 20.

The slack take-up structure 100 comprises a pair of arms 108 and 110 diverging rearwardly from a point of pivotal attachment on the pin 94 between the pick-up arm 84 and 86 and includes a cross bar 112 (FIG. 3) connecting between the rearward extremeties of the arms 108 – 110. Tension spring means 114 extending between respective points of attachment 116 and 118 on the take up structure and bracket 120 fixed to and spanning the pick-up arms 84 and 86 normally maintain the generally horizontal attitude of the take up structure 100.

As best illustrated in FIGS. 1 and 3, the vacuum conduit extends over the cross bar 112 and when it becomes necessary for an operator to extend the head 20 to engage a watermelon which is to be harvested, downward forces applied to the rigid conduit 104 transmit similar forces to the take up structure 100 through the flexible conduit 96, overcoming the spring forces of spring means 114 permitting the downward extension of the conduit 96 and allowing engagement of the head 20 with a watermelon W as illustrated in broken lines in FIG. 1. Upwardly extending stop arms 122 limit the upward movement of the take up structure 100 by engagement with the underneath surfaces of pick-up arms 84 and 86.

With reference now to FIG. 5 for a detailed description of the watermelon engaging and lifting head 20 which includes a disc shaped top plate 130 having an annular member 132 fixed as by welding, bolts, adhesive or the like about the underneath face 134 thereof. The member 132 is provided with an arcuately concave underneath surface 136 for the reception of a rubber tube like member 138 provided with an inflation stem 140. The rubber tube may be a very small size conventional inner tube which is adhesively secured in the arcuately concave underneath surface 136. An annular soft sponge rubber or foam platic ring 142 is adhesively secured about the underneath side of the inner tube as illustrated in FIG. 5. Preferably, the tube is inflated to a quite low pressure which, in combination with the soft sponge ring 142 readily permits deformation of the tube and ring to conform with the surface of a watermelon when the head 20 is firmly pressed thereon as indicated in broken lines in FIG. 1.

With further reference to FIG. 5, a valve block 144 is fixed to and extends upwardly from the top plate 130 and receives the threaded lower end 146 of the rigid vacuum conduit 104 in screw threaded engagement within its upper end. A vacuum port 148, in communication with the open lower end 146 of the conduit 104, slidably carries a ball valve 150 having a downward projecting stem portion 152 extending through concentric bores 154 and 156 in the lower end of the block 144 and the top plate 130 respectively. The stem portion 152 extends downwardly and terminates in an enlarged head portion 158 outwardly of the plane of the lower face 160 of the sponge ring 142. A compression spring 162 circumposed about the stem 152 beneath the underneath face 134 of the top plate 130 normally holds the ball valve on a seal 164 closing communication between ports 166, communicating between the open chamber 168 formed within the tube and ring 138 and 142 and the vacuum port 148, and ports 170, communicating between a reduced diameter chamber 172 beneath the valve seat 164 and the vacuum port 148.

When the head 20 is pushed downwardly on a watermelon, the enlarged head portion 158 of the ball valve stem 152 contacts the watermelon moving the stem upwardly unseating the ball valve 150 and opening communications between the chamber 168 and the vacuum conduit 104 through ports 166, 170 and 148, exhausting the air in chamber 168.

As illustrated in FIG. 6, there are preferably four each of ports 166 and 170 to provide for a rapid discharge of air from the chamber 168 when a watermelon is engaged by the sponge ring 142 to provide an almost instantaneous tight grip on the watermelon.

When a watermelon is engaged by the head 20 and the ball valve 164 is unseated creating a vacuum in the chamber 168 to hold the watermelon as just described, a pair of vacuum switches 180 and 182, having ports 184 and 186 to the chamber 168, are actuated to start one automatic cycle of the device.

The vacuum switch 180 is normally open and the vacuum switch 182 is normally closed and as best illustrated in FIG. 7, vacuum in chamber 168 opens normally closed switch 182 and closes normally open switch 180. When switch 180 closes, a circuit is completed through line 184, switch 180, line 186, normally closed rear limit switch 188 of the cylinder piston 54 to one side of a solenoid operated hydraulic valve 190 supplying fluid to the front of cylinder 56 through intake conduit 192 and conduit 194. The piston 54 moves rearwardly, turning sprocket 66 and pick up arms 84 and 86 clockwise by means of the chain 80 as previously described. The pick up stroke of the cycle continues until the piston is fully retracted at which time the watermelon is positioned over the conveyor 22 as illustrated in FIG. 2.

With further reference to FIG. 7, the piston 54 when fully retracted as in FIG. 2 contacts a pair of switches, normally closed switch 188 and normally open switch 196. When normally open switch 196 is contacted it is closed completing a circuit through lines 184, 198, solenoid exhaust valve 200, line 202, switch 196 and line 204. Chamber 168 is thereby opened to the atmosphere through valve 200 and port 206 causing the watermelon to drop onto the conveyor 22.

The switch 196 is preferably contacted a split second before switch 188 to drop the watermelon before the return stroke of the cycle begins. When the piston contacts switch 188 it is opened and normally open vacuum switch 180 reopens as the watermelon is discharged on the conveyor. However, normally closed vacuum switch 182 recloses when the watermelon is discharged completing a circuit through lines 184 and 207, switch 182, line 208, and normally closed front limit switch 210 to the other side of the solenoid operated hydraulic valve supplying fluid to the back of the cylinder 56 through intake conduit 192 and conduit 212. The piston 54 is thereby moved outwardly returning the pick-up arms 84 and 86 to the position illustrated in FIG. 1 by means of the chain and sprocket 80 and 66 in the manner previously described. When the piston rod contacts and opens the front limit switch 210, the entire circuit is deactivated until another watermelon is engaged by the head 20, creating a vacuum in the chamber 168 to start the next cycle.

It should be noted that the vacuum conduit 96 can be of a reinforced flexible type and support the weight of the pick up head 20 and the watermelon or supplemental chain or cable means can be employed to support the weight. Any type of bracket means indicated generally at 214 may be employed to adjustably attach the conduit 96 to the front ends of the pick-up arms 84 and 86.

As best illustrated in FIG. 3 the tubular frame members 30 and 32 of the boom may be utilized as the supply and return lines for the hydraulic fluid from a conventional hydraulic pump means (not shown) mounted on the harvesting vehicle. The intake lines 192 to the solenoid controlled hydraulic valves of each harvesting unit is connected to tube 30 as at 214 and the exhaust lines 216 are connected to tube 32 as at 218.

In the description of the operation of the harvesting unit as illustrated in the electrical and hydraulic schematic, FIG. 7, it was stated that the watermelon is positioned over the conveyor at the end of the pickup stroke of each cycle and is deposited thereon by the actuation of switch 196. It is, however, quite essential to provide a control or steadying means because of the pendulum nature of the pick up means, a heavy watermelon being swung inwardly to the discharge position will normally have a tendency to swing and sway in an uncontrolled manner.

A stabilizing and positioning means indicated generally at 220 in FIGS. 1 and 2 is provided to psotion the watermelon accurately and steadily. The stabilizing means includes an arm 222, pivoted at one end as at 224 to a lug 226, fixed as by welding to the main upright member 34. One end of a first control cable 228 is clamped to the lower run of the drive chain 80 as at 230 and extends rearwardly over a pulley 232, carried on a lug 234 fixed to the lug 60, and passes downwardly to a point of attachment 236 to the arm 222 intermediate the ends thereof. Therefore, during the pick up stroke of the cycle, when the sprocket is turning clockwisely, the cable 228 is pulled forwardly toward the sprocket 66 and the arm 222 is swung about pivot 224, from its downwardly extending position of FIG. 1, to an upwardly extending positioned as illustrated in FIG. 2.

A second pair of control cables 238, having one end 240 pivotally attached to the watermelon pick-up head 20 as at 242, passes upwardly and rearwardly over pulleys 244, pivotally attached to the free ends 246 of the arms 222. The cables 238 then pass rearwardly and downwardly over pulleys 248, pivotally attached as at 250 to rearwardly extending brackets 252 fixed to the upright 34. A counterweight 254 is attached to the free ends of the cables 238 and in the attitude illustrated in FIG. 1 exert a steadying effect on the pick-up head 20.

As the pick-up stroke of the piston commences, the arm 222 is pivoted upwardly, about the pivot 224, drawing the second control cables 238 upwardly because of their engagement over pulleys 244. Because the counterweights 254 are made considerably lighter in weight than the combined weights of the watermelon and pick-up head 20, the downwardly extending portion 256 of the cables carrying the counterweight, will be drawn upwardly first and continue until the counterweight contacts the bottom of the bracket 252. During the balance of the pick-up stroke of the piston, the cables 238 will be drawn upwardly, about pulleys 259 pulling inwardly on the pick-up head 20 and the watermelon until the watermelon is perfectly positioned over the conveyor 22 as seen in FIG. 2. It is obvious that the second pair of control cables must be made to a predetermined length or the counterweight 254 can be adjustable along the length of the cables. A contact cushion 260 may be provided as illustrated in FIGS. 1 and 2 to provide a positive stop because of varying lengths of watermelons.

While a preferred form of the present invention has been illustrated and described, it is obvious that many changes, variations and substitutions in mechanical, electrical and hydraulic means may be made without deviating from the spirit of the invention.

I claim:

1. A watermelon harvesting device for attachment to a suitable power propelled vehicle for movement through a watermelon field for the purpose of harvesting the watermelons therein, comprising;
   A. a main frame structure;
   B. a vacuum operated watermelon engaging and pick-up head;
   C. vacuum means for providing a vacuum in said head, including,
      1. vacuum conduit means connected to said pick-up head;
   D. pick-up arm means rotatable in a generally vertical plane and including,
      1. pivoted end, and
      2. an outwardly extending swinging end for arcuate movement in both clockwise and counter-clockwise directions in said vertical plane;
   E. a reversable power source connected to said main frame structure;
   F. mechanical power transmission means supported by said frame structure and connected to said power source, including a rotatable member carrying said pivoted end of said pick-up arm means for imparting said arcuate movement thereto and to said outwardly extending swinging end;
   G. suspension means connecting said outwardly extending swinging end and said pick-up head;
   H. vacuum control means in said pick-up head whereby engagement of a watermelon by said pick-up head activates vacuum forces in said pick-up head whereby the watermelon is tightly held thereon;
   I. power control means on said pick-up head, which are actuated when the watermelon is tightly held thereon, to energize said reversable power source to cycle the harvester whereby the watermelon is picked up from the ground and swung to a predetermined discharge station by said rotatable arm means, where it is deposited causing said power source to reverse and swing said pick-up head to its start position.

2. A watermelon harvesting device as defined in claim 1 in which said conduit means comprises a tubular pipe which constitutes a part of said main frame structure and which is adapted to be connected to said vacuum means and a flexible vacuum conduit connecting to and extending between said tubular pipe and said pick-up head.

3. A watermelon harvesting device as defined in claim 1 in which said watermelon engaging and pick-up head comprises, a top plate member, a resilient ring member fixed to the bottom surface of said top plate, providing a generally annular bottom surface which is adapted to engage the surface of and conform to the shape of the engaged portion of the surface of a watermelon when so engaged and a central chamber within said ring member which is closed to the atmosphere when a watermelon is so engaged; a vacuum control block mounted atop said top plate including said vacuum control means therein, a rigid conduit connecting between said flexible vacuum conduit and said vacuum control means; stem means extending downwardly from said vacuum control means through said top plate which is adapted to contact the surface of a watermelon and open said vacuum control means to said central chamber just prior to contact between said resilient ring and the surface of the watermelon creating a vacuum in said closed chamber the instant the surface of a watermelon is contacted by said resilient ring.

4. A watermelon harvesting device as defined in claim 3 in which said vacuum control means comprises a ball valve having a stem portion of said stem means extending downwardly through said top plate for contact with the surface of a watermelon, a valve seat and spring means to normally maintain said ball valve on said seat, port means extending between said central chamber and said rigid conduit which are normally closed when said ball valve is on said seat and opened to create a vacuum in said chamber when control is made by said stem with the surface of a watermelon, moving said stem portion upwardly and seating said ball valve.

5. A watermelon harvesting machine as defined in claim 3 in which said resilient member comprises an inflatable tube such as a small size inner tube and a soft sponge ring member secured about the underneath side of said tube.

6. A watermelon harvesting device as defined in claim 1 in which said reversable power source comprises a hydraulic cylinder and a solenoid actuated hydraulic control valve means, said hydraulic cylinder including a piston rod movable between extended and retracted positions as determined by the direction of flow of the fluid from said hydraulic control valve, and front and rear normally closed piston rod limit switches.

7. A watermelon harvesting device as defined in claim 6 in which said piston rod is driven by fluid supplied to said hydraulic cylinder through said solenoid actuated hydraulic control valve from a hydraulic pump means in the vehicle and utilizing tubular members which form part of said main frame structure as intake and exhaust conduits to said hydraulic control valve.

8. A watermelon harvesting device as defined in claim 6 in which said power control means in said pickup head comprises first and second vacuum operated electric switches mounted atop said top plate and a solenoid operated exhaust valve simularly mounted; three ports opening from the bottom of said top plate to the respective vacuum operated electric switches and said exhaust valve; electric circuit means controlled by said vacuum operated electric switches, said front and rear limit switches and a trip switch located closely adjacent said rear limit switch, said first vacuum operated electric switch being actuated by the vacuum in said central chamber when a watermelon is engaged by said pick-up head to close a first electric circuit through said rear limit switch to said solenoid actuated hydraulic control valve to drive said piston rod in a first direction to move the watermelon from its position on the ground to said discharge station, said trip switch then being actuated by said piston rod completing a second circuit to said exhaust valve to cause discharge of the watermelon whereupon a third circuit is completed by the loss of vacuum to complete a third electric circuit through said second vacuum operated electric switch and said front limit switch to said solenoid actuated hydraulic valve to reverse said piston rod and to drive same in a second direction to return said pick-up head to its start position, said piston rod then contacts said front limit switch to deactivate said third circuit.

9. A watermelon harvesting device as defined in claim 8 in which said first vacuum operated electric switch is a normally open type switch, said second vacuum operated electric switch is a normally closed type of switch, both front and rear limit switches are normally closed types and said trip switch being a normally open type.

10. A watermelon harvesting device as defined in claim 1 in which said discharge station comprises a conveyor means carried by said main frame structure.

11. A watermelon harvesting device as defined in claim 8 in which said mechanical power transmission means comprises first and second spaced apart sprockets, rotatably journalled on said main frame and chain means disposed about said sprockets, said first sprocket comprising said rotatable member and being positioned forwardly of said hydraulic cylinder and piston rod, said piston rod being fixed to said chain to transmit the movements of said piston rod to said pick-up arms through said first sprocket and chain.

12. A watermelon harvesting device as defined in claim 11 including a watermelon positioning and stabilizing means whereby the watermelon is stabilized during its movement from the ground to said discharge station and accurately positioned at said discharge station.

13. A watermelon harvesting device as defined in claim 12 in which said watermelon positioning and stabilizing means comprises an arm having first and second ends, said first end being pivotally attached to said main frame and said second end carrying a first pulley means; a first control cable and a second pulley means, said first control cable having a first end attached to said chain means and a second end attached to said arm intermediate said first and second arm ends, said first cable passing rearwardly from said chain means and then downwardly over said second pulley means to said point of attachment to said arm; a second control cable, third and fourth pulley means, a bracket means fixed to said main frame and a counterweight, said second control cable having a first end attached to said pick-up head and a second end attached to said counterweight, said second control cable extending rearwardly from said pick-up head, passing under said third pulley means which is rotatably attached to said main frame, over said first pulley carried on said second end of said arm, then outwardly over said fourth pulley rotatably attached to said bracket means and then downwardly to said counterweight.

14. A watermelon harvesting device as defined in claim 1 including a slack take up structure for said vacuum conduit means and said suspension means.

15. A watermelon harvesting device as defined in claim 14 wherein said slack take up structure comprises, a frame unit pivotally attached at one end to said outwardly swinging end of said pick up arm and including a transverse member at its opposed end spaced from said pivotally attached end; tension spring means extending between said pick up arm and said frame unit to maintain said frame unit in a normal generally horizontal attitude, said vacuum conduit means and suspension means passing generally horizontally rearwardly from said outwardly swinging end, over said transverse member and then downwardly to said pick up head.

16. A watermelon harvesting device as defined in claim 1 including a boom structure adapted to be mounted upon said power propelled vehicle and extending laterally outwardly therefrom in a manner so as to overlie and pass over a portion of a watermelon field being harvested and at least two of said watermelon harvesting devices fixed to said boom structure, said discharge station comprising a conveyor means carried by said boom structure and operable to convey watermelon discharged thereon to said power propelled vehicle.

17. A watermelon harvesting device as defined in claim 16 in which said boom structure is adapted to be pivotally attached to said power driven vehicle and includes drive means for swinging said boom structure upwardly and downwardly about said pivotal attachment.

18. A watermelon harvesting device as defined in claim 17 in which one of said boom structures is adapted to be mounted to each side of said power propelled vehicle.

* * * * *